United States Patent [19]
Sarangdhar et al.

[11] Patent Number: 5,937,171
[45] Date of Patent: *Aug. 10, 1999

[54] METHOD AND APPARATUS FOR PERFORMING DEFERRED TRANSACTIONS

[75] Inventors: Nitin V. Sarangdhar, Beaverton; Konrad K. Lai, Aloha; Gurbir Singh, Portland; Peter D. MacWilliams, Aloha, all of Oreg.

[73] Assignee: Intel Corporation, Santa Clara, Calif.

[ * ] Notice: This patent is subject to a terminal disclaimer.

[21] Appl. No.: 08/669,101

[22] Filed: Jun. 26, 1996

Related U.S. Application Data

[63] Continuation of application No. 08/302,600, Sep. 8, 1994, Pat. No. 5,615,343, which is a continuation-in-part of application No. 08/085,541, Jun. 30, 1993, Pat. No. 5,568,620.

[51] Int. Cl.⁶ .......................... H04L 12/417; G06F 13/14
[52] U.S. Cl. .......................... 395/285; 395/292; 395/831; 395/859; 340/825.07; 340/825.52
[58] Field of Search ...................... 395/285, 292, 395/200.67, 831, 825.07, 825.52, 859

[56] References Cited

U.S. PATENT DOCUMENTS

| | | | |
|---|---|---|---|
| 4,181,974 | 1/1980 | Lemay et al. | 364/900 |
| 4,488,232 | 12/1984 | Swaney et al. | 395/200.08 |
| 4,841,436 | 6/1989 | Asano et al. | 395/250 |
| 5,006,982 | 4/1991 | Ebersole et al. | 395/736 |
| 5,197,137 | 3/1993 | Kumar et al. | 395/375 |
| 5,235,684 | 8/1993 | Becker et al. | 395/280 |

FOREIGN PATENT DOCUMENTS 0275135  1/1988  European Pat. Off. .

OTHER PUBLICATIONS

European Search Report dated Feb. 1, 1996; App. No. G06F13/14.

Val Popescu, Merle Schultz, John Spracklen, Gary Gibson, Bruce Lightner and David Isaman, "The Metaflow Architecture", IEEE Micro, Jun. 1991, pp. 10–13 and 63–73.

*Primary Examiner*—Jack A. Lane
*Attorney, Agent, or Firm*—Blakely, Sokoloff, Taylor & Zafman

[57] ABSTRACT

A method and apparatus of performing bus transactions on the bus of the computer system. The present invention includes a method and apparatus for permitting out-of-order replies in a pipelined bus system. The out-of-order responses include the sending of tokens between both the requesting agents and the responding agents in the computer system without the use of dedicated token buses.

43 Claims, 7 Drawing Sheets

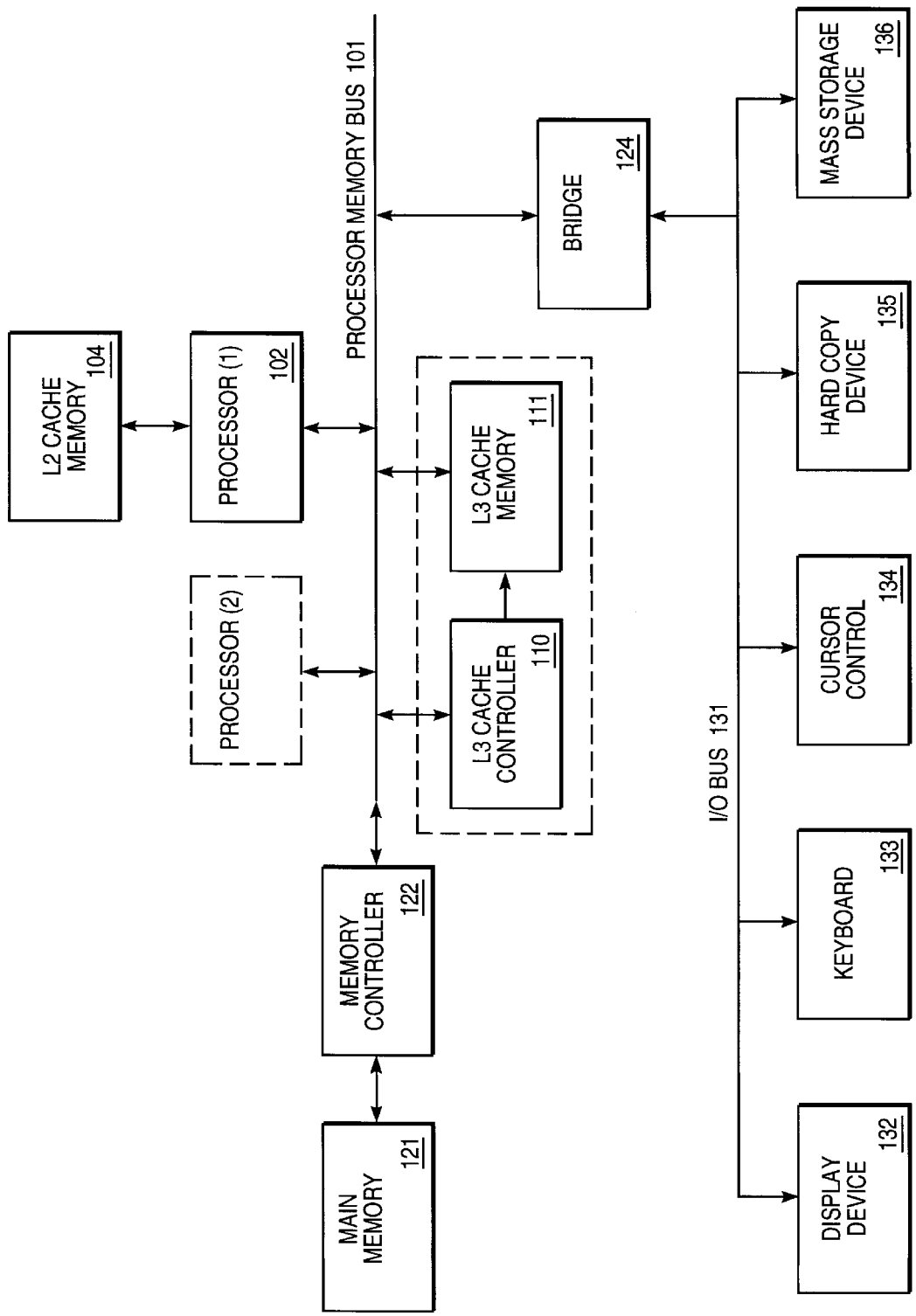
FIG_1

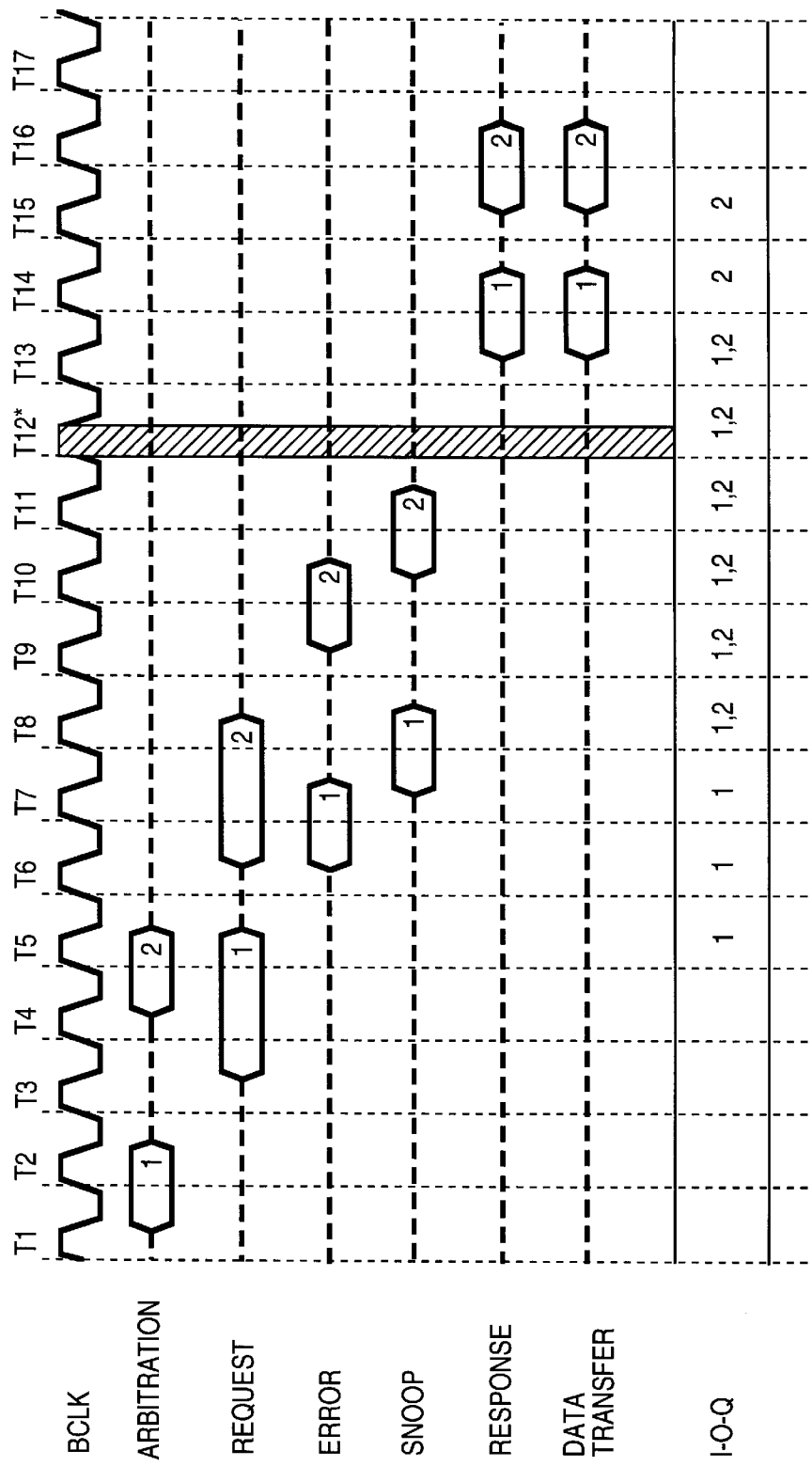
FIG_2
*NOTE: THE SHADED VERTICAL BAR INDICATES ONE OR MORE CLOCK CYCLES ARE ALLOWED BETWEEN DIFFERENT PHASES.

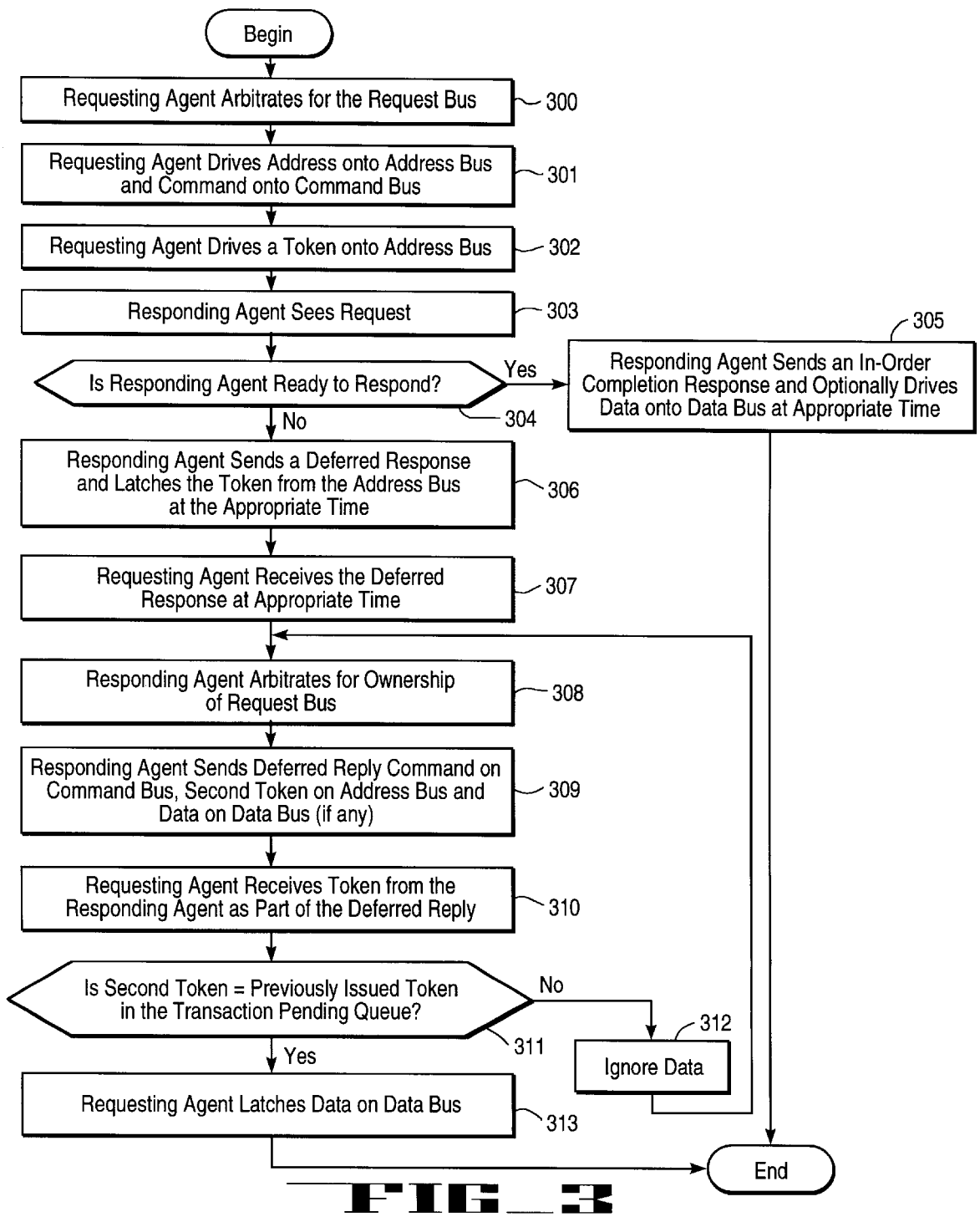
FIG_3

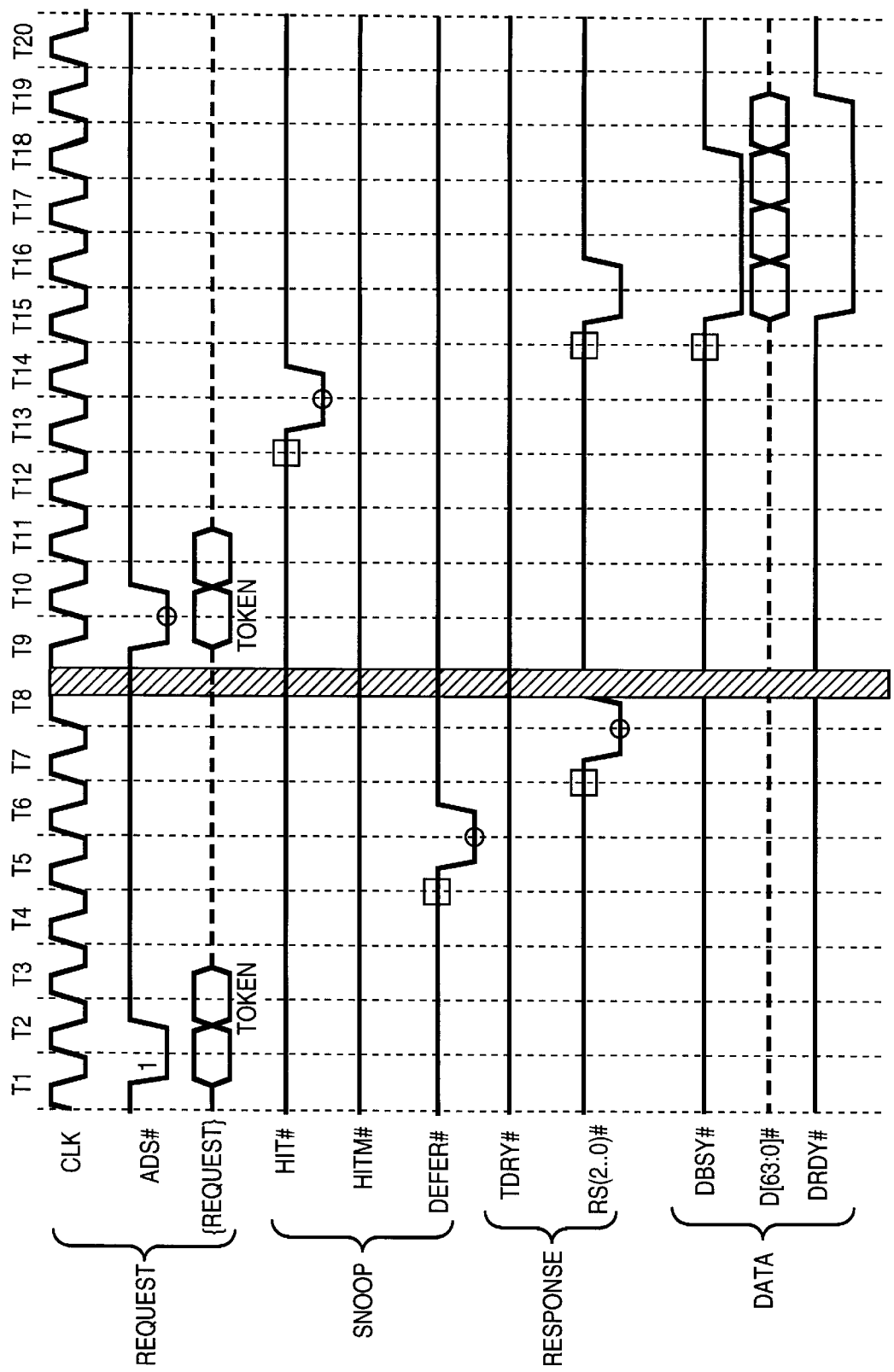
FIG_4

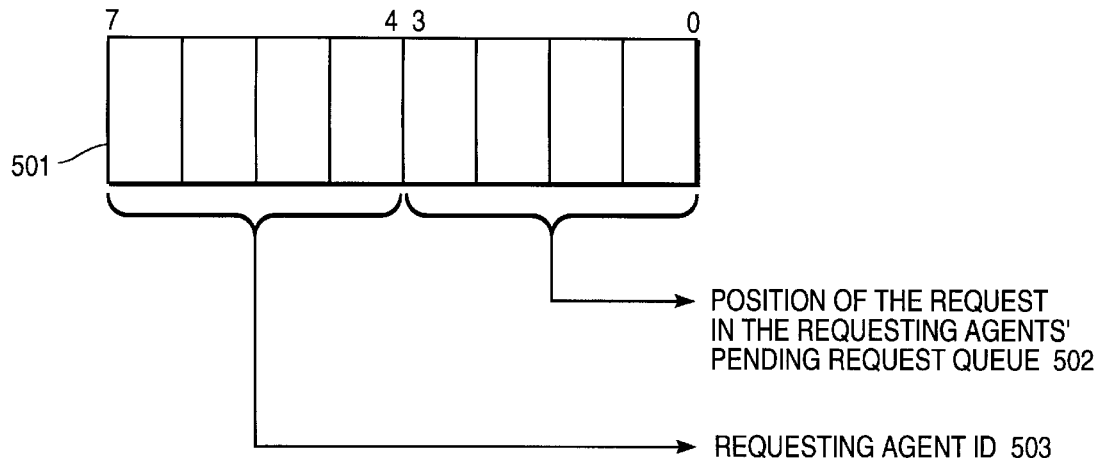
FIG_5
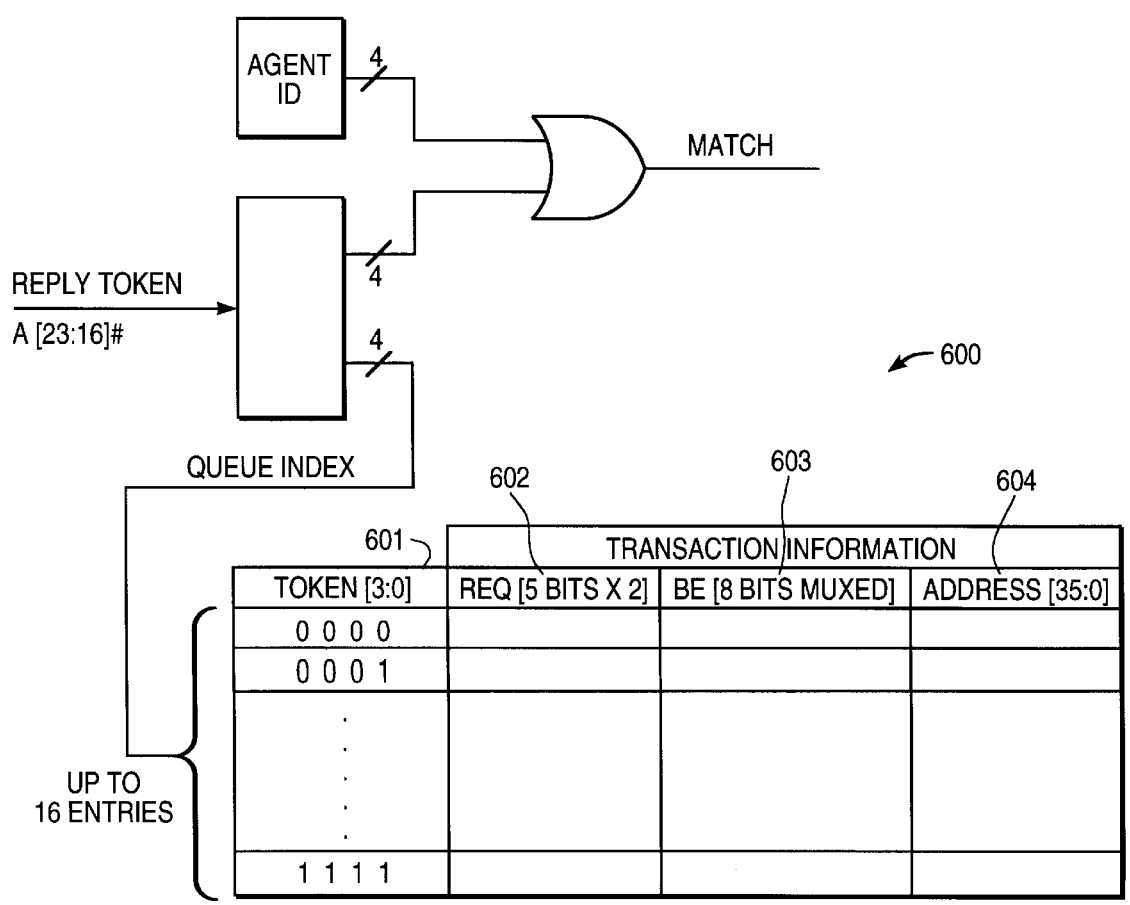
FIG_6

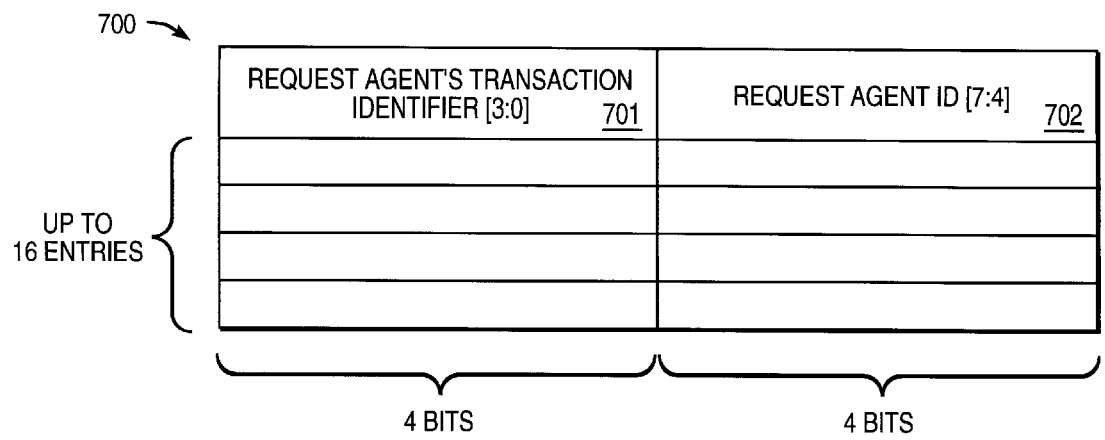
FIG_7
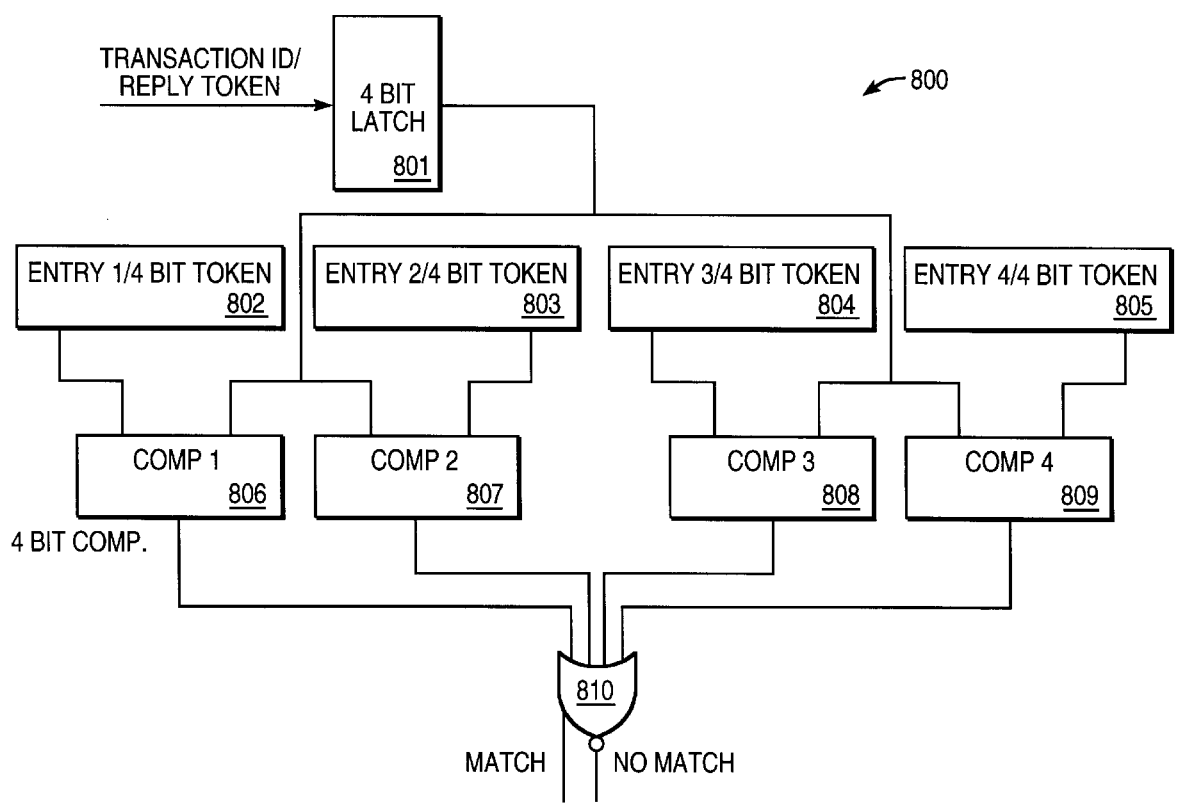
FIG_8

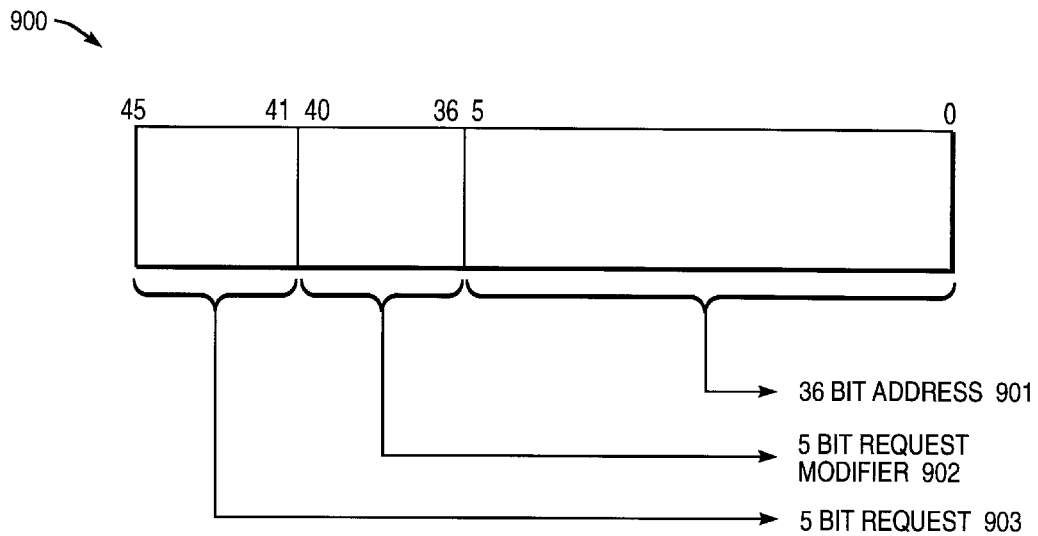
FIG_9
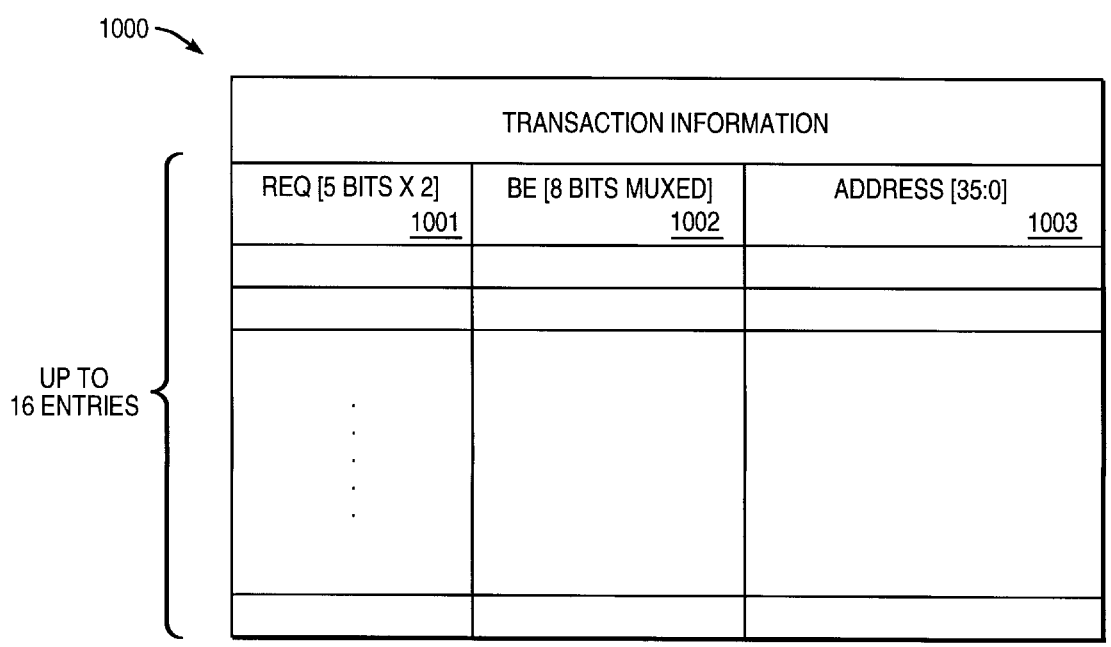
FIG_10

METHOD AND APPARATUS FOR PERFORMING DEFERRED TRANSACTIONS

This is a continuation of application Ser. No. 08/302,600, filed Sep. 8, 1994, now Pat. No. 5,615,343 which is a continuation-in-part of application Ser. No. 08/085,541, filed Jun. 30, 1993, Pat. No. 5,568,620.

FIELD OF THE INVENTION

The invention relates to the field of protocols for computer system buses; particularly, the present invention relates to protocols for buses that perform deferred/out-of-order transactions.

BACKGROUND OF THE INVENTION

In a computer system, transfers between devices such as processors, memories, input/output (I/O) units and other peripherals generally occur according to a protocol. These devices are commonly referred to as agents. The protocol is a method of handshaking that occurs between the devices during a transfer which allows each device involved in the transfer to know how the other device is going to act or perform.

Typically, transfers of data and information in a computer system are performed using multiple buses. These buses may be dedicated buses between only two devices or non-dedicated buses that are used by a number of units, bus agents or devices. Moreover, buses in the system may be dedicated to transferring a specific type of information. For instance, an address bus is used to transfer addresses, while a data bus is used to transfer data.

A bus transaction normally includes a requesting device, or agent, requesting data or a completion signal from another agent on the bus. The request usually includes some number of control signals indicating the type of request accompanied by the address of the desired data or the desired device. The device which is mapped into the address space containing the requested address responds by sending a completion signal along with any data as necessary.

In some computer systems, bus transactions occur in a pipelined manner. When bus transactions are pipelined, the requests from numerous bus agents are pending at the same time. This is possible due to the fact that separate data and address buses are used. In a pipelined transaction, while an address of a request is being sent on the address bus, the data or signals corresponding to a previously requested address (on the address bus) may be returned on the data bus. In certain pipelined systems, the completion responses occur in the same order as they were requested. However, in other pipelined systems, the order of the completion responses does not have to occur in the same order as their corresponding requests. This type of bus system is commonly referred to as a split transaction bus system.

In split transaction buses, a request is initiated with a first bus transaction to one of the agents in the computer system. If the responding agent cannot provide the response to the request at this time, the response corresponding to the request may be disassociated from the request. Eventually, when the response is ready, the response with optional data is returned to the requesting agent. The requests may be tagged so that they may be identified by the requesting agent upon their return.

To accommodate split transactions, the systems require some capability of associating a response with its address (i.e., its request). One approach is to use two separate token buses and a deferred bus. When performing a request, an address is driven onto the address bus. At the same time, a token is driven on the first token bus. This token is associated with the address request. The token is received by the agent which is to respond to the address request (i.e., the responding agent). When the agent is able to respond at this time, the responding agent drives the token on the second token bus and the appropriate response on the data bus.

Using two token buses increases the number of pins that are required to interface with the external bus. For tokens that are 8-bits in size, using two separate token buses requires an additional sixteen pins to be added to the computer system, as well as additional space allocated on the computer board for the token buses. Moreover, the pins used to support the token buses must also be added to every bus agent package in the system. An increase in the number of pins often equates to an increase in the cost of the package. Thus, the cost of integrated circuit components in the system increases. On the other hand, the increase in bandwidth due to permitting split transactions is significant due to the ability to reorder long latency transactions behind short latency transactions issued later. It is desirable to support split bus transactions without incurring most of the increased cost of modifying integrated circuit components and the increased number of pins required.

In the prior art, some responding agents provide a retry response in response to a request from a bus agent. The retry response indicates to the bus agent sending the request that the responding agent is not ready to respond and that the request should be tried again later. The requesting agent then polls the responding agent from time to time to identify its availability for the transfer. After giving a retry response, the responding agent may continue processing the request. When it is ready to complete the transaction, it gives a completion response to the requesting agent and terminates polling. One problem with such a scheme is that the unnecessary polling increases bus traffic. It is desirable to reduce bus traffic when providing a retry response. Note that it is also desirable to minimize cost for bus agents unable to accomodate split transactions.

The present invention provides a method and apparatus for implementing such a bus protocol. The protocol of the present invention provides a method and apparatus for accommodating split transactions without the use of separate token buses and without the increased number of pins associated with them.

SUMMARY OF THE INVENTION

A method and apparatus for performing split bus transactions in a computer system is described. The computer system includes separate data and address buses that allow bus transactions to occur in a pipelined manner. The present invention includes a method and apparatus for initiating a first bus transaction and driving a request address on the address bus. The request address is driven by a requesting device, or agent. The responding agent drives a deferral response if unable to respond at this time. The present invention also includes a method and apparatus for driving a first token by the requesting agent on the address bus associated with the request and the address. The request address is driven on a common multiplexed address bus during the first clock and the token is driven on the common multiplexed address bus during the second clock. A responding device receives the first token and may store it internally for later use when the responding device is ready to, or is capable of, satisfying the address request. Once stored, the first bus transaction has completed.

When the responding device is ready, or is capable of, satisfying the request (e.g., the data is ready, the completion signals may be sent, etc.), the responding device initiates a second bus transaction and drives a second token on the address bus. Also the responding device drives any necessary data onto the data bus which corresponds to the original address request. In one embodiment, the second token is identical to the first token. The original requesting device receives the second token and compares the second token to the first token corresponding to its original address request. Upon determining that a match exists, the requesting device receives the completion signals and receives the data, if any, from the data bus, thus completing the second bus transaction.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of one embodiment of the computer system of the present invention.

FIG. 2 is a timing diagram of a bus transaction in the currently preferred embodiment.

FIG. 3 is a flow diagram of a bus cycle according to the present invention.

FIG. 4 is a timing diagram of depicting a deferred response according to the present invention.

FIG. 5 illustrates an 8-bit token of the present invention.

FIG. 6 illustrates one embodiment of the transaction pending queue in the receiving agent.

FIG. 7 illustrates one embodiment of the transaction pending queue requesting agent.

FIG. 8 is a block diagram of one embodiment of the token matching hardware of the requesting agent.

FIG. 9 illustrates one embodiment of a token which uses the address of the request as part of the token.

FIG. 10 illustrates one embodiment of the transaction pending queue in the responding agent.

DETAILED DESCRIPTION OF THE INVENTION

A method and apparatus for accommodating split transactions in a computer system is described. In the following detailed description of the present invention numerous specific details are set forth, such as token size, queue size, etc., in order to provide a thorough understanding of the present invention. However, it will be apparent to one skilled in the art that the present invention may be practiced without these specific details. In other instances well known methods, functions, components and procedures have not been described in detail as not to obscure the present invention.
Overview of the Computer System of the Present Invention Referring first to FIG. 1, an overview of one embodiment of the computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification.

As illustrated in FIG. 1, in this embodiment, the computer system generally comprises of a processor-memory bus or other communication means 101 for communicating information and a processor 102 coupled with processor-memory bus 101 for processing information. In the present invention, processor-memory bus 101 includes subsidiary address, data and control buses. Processor 102 includes an internal cache memory, commonly referred to as a level one (L1) cache memory for temporarily storing data and instructions on-chip. A level two (L2) cache memory 104 is coupled to processor 102 for temporarily storing data and instructions for use by processor 102. In one embodiment, cache memory 104 is included in the same chip package as processor 102.

A level three (L3) cache memory 111 for temporarily storing data and instructions for use by other devices in the computer system (e.g., processor 102, etc.) and a L3 cache controller 110 for controlling access to L3 cache memory 111 are also coupled to processor-memory bus 101.

A memory controller 122 is coupled with processor-memory bus 101 for controlling access to a random access memory (RAM) or other dynamic storage device 121 (commonly referred to as a main memory) for storing information and instructions for processor 102.

An input/output (I/O) bridge 124 is coupled to processor-memory bus 101 and I/O bus 131 to provide a communication path or gateway for devices on either processor-memory bus 101 or I/O bus 131 to access or transfer data between devices on the other bus. Bridge 124 performs functions such as turning the byte/word/double-word data transfer traffic from I/O bus 131 into line size traffic on processor-memory bus 101.

I/O bus 131 communicates information between devices in the computer system. Devices that are coupled to I/O bus 131 include a display device 132, such as a cathode ray tube, liquid crystal display, etc., for displaying information to the computer user, an alphanumeric input device 133 including alphanumeric and other keys, etc., for communicating information and command selections to other devices in the computer system (e.g., processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to I/O bus 131.

Of course, other embodiments of the present invention may not require nor include all of the above components, while other embodiments require or include additional components. For example, in certain embodiments, L3 cache controller 110 and L3 cache memory 111 may not be required. Also, the computer system may include an additional processor coupled to the processor-memory bus 101. The additional processor may comprise a parallel processor, such as a processor similar to or the same as processor 102, or may comprise a co-processor, such as a digital signal processor. In such embodiments, processor 102 and the additional processor(s) reside directly on a processor-memory bus 101. In other embodiments, it may not be required to provide a display device for displaying information.
Bus Transactions in the Present Invention In the present invention, devices and units in the computer system perform bus transactions on the processor-memory bus. In one embodiment, the address bus and portions of the control bus of the processor-memory bus together function as a "request" bus for initiating and responding to requests. This "request" bus is used by the initiator of a request (e.g., a requesting agent) to transfer the request type and address and same bus is used by observers (e.g., responding agents) of the request to transfer their status or response for the issued transaction. The data bus transfers data being read or written.

In one embodiment, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. A transaction is the set of bus activities related to a single request, from request bus arbitration through response-initiated data transfers on the data bus.

A transaction contains up to six phases. However, certain phases are optional based on the transaction and response type. A phase uses a particular signal group to communicate a particular type of information. In one embodiment, the six phases are:

Arbitration

Request

Error

Snoop

Response

Data

The data phase is optional and used if a transaction transfers data on the data bus. The data phases are request-initiated, if the data is available at the time of initiating the request (e.g., for a write transaction), and response-initiated, if the data is available at the time of generating the transaction response (e.g., for a read transaction).

Different phases from different transactions can overlap, thereby pipelining bus usage and improving bus performance. FIG. 2 is a timing diagram illustrating transaction phases for two transactions with data transfers. Referring to FIG. 2, when the requesting agent does not own the bus, transactions begin with an Arbitration Phase in which a requesting agent becomes the bus owner.

After the requesting agent becomes the bus owner, the transaction enters the Request Phase, in which the bus owner drives a request, and address information on the bus. The Request Phase is two clocks in duration. In the first clock, the ADS# signal is driven along with the transaction address and sufficient information to begin snooping and memory access. In the second clock, information used to identify the request (e.g., a token) and information about the length of the transaction are driven, along with other transaction information.

After the Request Phase, a new transaction enters a first-in-first-out (FIFO) queue, the In-Order queue. All bus agents, including the requesting agent, maintain an In-Order queue and add each new request to those queues. For more information on the in-order queue, see U.S. patent application Ser. No. 08/206,382 entitled "Highly Pipelined Bus Architecture", filed Mar. 1, 1994, assigned to the corporate assignee of the present invention and incorporated herein by reference. In FIG. 2, for example, request 1 is driven in T3, observed in T4, and in the In-Order beginning in T5.

The third phase of every transaction is an Error Phase, three clock cycles after the Request Phase. The Error Phase indicates any immediate (parity) errors triggered by the request.

If the transaction isn't canceled due to an error indicated in the Error Phase, a Snoop Phase is entered, four or more cycles from the Request Phase. The results of the Snoop Phase indicate if the address driven for a transaction references a valid or modified (dirty) cache line in any bus agent's cache. The Snoop Phase results also indicate whether a transaction will be completed in-order or may be deferred for possible out-of-order completion.

Transactions proceed through the In-Order Queue in FIFO order. The topmost transaction in the In-Order Queue enters the Response Phase. The Response Phase indicates whether the transaction has failed or succeeded, whether the transaction completion is immediate or deferred, whether the transaction will be retired and whether the transaction includes a Data Phase.

The valid transaction responses are: normal data, implicit writeback, no data, hard failure, deferred, and retry.

If the transaction does not have a Data Phase, the transaction is complete after the Response Phase. If the request agent has write data to transfer, or is requesting read data, the transaction has a Data Phase which may extend beyond the Response Phase.

In one embodiment, not all transactions contain all phases, not all phases occur in order, and some phases can be overlapped. All transactions that are not canceled in the Error phase have the Request, Error, Snoop, and Response Phases. Also, arbitration may be explicit or implicit in that the Arbitration Phase only needs to occur if the agent that is driving the next transaction does not already own the bus. The Data Phase only occurs if a transaction requires a data transfer. The Data Phase can be absent, response-initiated, request-initiated, snoop-initiated, or request- and snoop-initiated. The Response Phase overlaps the beginning of the Data Phase for read transactions (request-initiated data transfers or snoop-initiated data transfers). The Request Phase triggers the Data Phase for write transactions (request-initiated data transfers).

Bus Protocol of the Present Invention

In the present invention, operations are performed on the processor-memory bus according to a bus protocol. The devices and units in the computer system of the present invention represent both requesting agents and responding agents. A requesting agent is a device which is capable of requesting a bus operation that involves receipt of one or more completion signals and, optionally, data from another device. A responding agent is a device which is capable of responding to the request by sending the necessary signals and, optionally, data in response to the request. Responding agents that are able to accommodate split transactions are referred to herein as "smart" responding agents, while responding agents that cannot accommodate split transactions are referred to herein as "dumb" responding agents. Note that in the following description, the terms "agent" and "device" may be used interchangeably.

In the present invention, bus transactions occur on the buses in the computer system in a pipelined manner. That is, multiple bus transactions may be pending at the same time, wherein each is not fully completed. Therefore, when a requesting agent begins a bus transaction, the bus transaction may only be one of a number of bus transactions currently pending. Although bus transactions are pipelined, the bus transactions in the present invention do not have to be fully completed in order. The present invention allows for some of the completion replies to requests to be out-of-order by supporting deferred transactions. Non-split transactions are completed in order.

The present invention accommodates deferred transactions by essentially splitting a bus operation into two independent bus transactions. The first bus transaction involves a request (for data or completion signals) by a requesting agent, and a response by the responding agent. The request may include sending an address on the address bus. The request may also include the sending of a token, which the requesting agent uses to identify its request. The response may include the sending of completion signals (and possibly data) if the responding agent is ready to respond. In this case, the bus transaction ends, as well as the bus operation. However, if the responding agent is not ready to respond to the request (e.g., the completion signals and/or the optional data are not ready), the response may include providing an indication to the requesting agent that its response to the request will be deferred. This indication will be referred to herein as a deferral response.

In case of a deferral response, the bus operation comprises a second transaction that includes the responding agent sending a deferred reply with the completion signals and requested data (if any) to the requesting agent, such that the requesting agent completes the transaction. In one embodiment, the deferred reply includes completion signals (and possibly data) and comparison request identifying information. The request identifying information comprises the token. That is, the token is resent by the responding agent to the requesting agent so that the requesting agent can associate the deferred reply with the original request. Deferred and non-deferred bus transactions according to one embodiment of the present invention are depicted in the flow chart of FIG. 3.

Referring to FIG. 3, a bus transaction, deferred or non-deferred, begins when a requesting agent arbitrates for ownership of the address and control bus as used to make requests (processing block 300). Note that the control bus is used, in part, for the purposes of specifying commands, including those commands defining each bus transaction. In the present invention, the requesting agent arbitrates for the address bus and drives addresses and control signals to be used to specify a command. Upon winning the arbitration, the requesting agent drives a request in the form of an address onto the address bus (processing block 301) and the requisite control signals in a manner well-known in the art, and a first token onto the address bus (processing block 302). In one embodiment, the address and the first token are driven on the bus in two consecutive clocks. The token is stored in a queue, referred to as a pending request queue, with an indication of the request with which it is associated.

Once a request has been placed onto the bus, a determination of which device is to be the responding agent occurs (processing block 303). This determination includes a responding agent recognizing the address that was driven onto the address bus. In one embodiment, the responding agent is the device which is mapped into the address space that includes the address of the request.

The responding agent then determines if it is ready to respond (processing block 304). In case of a read operation, the responding agent is ready to respond if the data requested is available. In case of a write operation, the responding agent is ready to respond if it begins completing the write operation upon receipt, or, if capable of a post write, the responding agent is ready to respond as soon as the data and address are received (where the actual writing of the data is finished later). If the responding agent is ready to respond, then the responding device sends an "in-order" completion response indication and drives the necessary signals or data on the data bus at the appropriate time (processing block 205), thereby ending the bus transaction, and the bus operation as non-deferred.

If the responding agent is not ready to complete the bus transaction, then the responding agent latches the first token from the address bus and sends a deferral response at its appropriate response time (processing block 306). The responding agent may not be ready to respond if the data is not ready by the time the responding agent is required to respond in case of a read operation. The responding agent may not be ready to respond until a write operation has been completely finished, such as in the case of a write to an I/O device.

The requesting agent receives the deferral response on the bus at the appropriate time (processing block 307). The appropriate time is dictated by the pipelined nature of the system bus, which will be described in more detail below.

A number of additional bus transactions may be run on the bus after the requesting agent receives the deferral response before the responding agent is finally able to satisfy the request. When the responding agent is ready to complete the deferred bus operation (e.g., the data does become available to the responding agent), the responding agent arbitrates for ownership of the address bus and the control bus (e.g., the request bus) (processing block 308).

Once ownership has been granted to the responding agent, the responding agent sends a deferred reply (processing block 309). As part of the deferred reply, the responding agent sends a second token on the address bus, a deferred reply signal (e.g., command) on the control bus and any appropriate data on the data bus. In one embodiment, the second token is the same as the first token; however, in other embodiments, the first and second tokens may not be the same, yet have a unique relationship to allow agents to correctly associate one with the other.

The requesting agent monitors the address bus, along with other agents, and receives the token (processing block 310). The requesting agent latches the second token. The requesting agent then determines whether the second token sent from the responding agent matches one of the outstanding tokens in its pending request queue (processing block 311). In such a case, the requesting agent performs a token match between the second token sent from the responding agent and the first token, or any other token stored in the requesting agent. It should be noted that in the present invention, the requesting agent is always monitoring the address bus for addresses and agent IDs and constantly determines if the signals on the address bus represent an address within the address range mapped to the agent or if the signals represent a token.

If the requesting agent determines that second token from the responding agent does not match the first token, then the data on the data bus and the completion signal(s) are ignored (processing block 312). If the requesting agent determines that second token from the responding agent matches the first token, then the deferred reply data on the data bus and/or the completion signals is the data or completion signals originally requested by the requesting agent and the requesting agent receives the completion signals and/or latches the data on the data bus (processing block 313), thus completing the second bus transaction. After receiving the completion signals and/or data corresponding to the original request, the entire bus operation ends. Thus, the bus transaction occurs between the responding agent and the requesting agent and the original bus operation is completed.

After a device has been determined to be the responding agent, the responding agent is responsible for generating a response to ensure that bus retains its pipelined nature. A responding agent may not be able to complete the requested bus transaction at the appropriate times. For example, the data requested may not be available. The data may not be available for numerous reasons. For example, the data may not be available due to long access times of a particular device. Also, the preparation of a response to satisfy the request may require a large number of cycles to complete due to the structure or the nature of a particular device.

Therefore, in the event that the responding agent cannot complete the requested bus transaction at the appropriate times, the responding agent sends a deferral response. The responding agent sends either the requested data or completion signals (if ready to respond) or a deferred completion indication comprising a deferral response (if unable to supply the requested completion signals or the requested data) at the appropriate time.

The appropriate time for a responding agent to generate a response is defined as that time at which the responding agent must respond with some type of response in order to retain the order of the responses on the data bus with those requests that occurred on the address bus, thereby ensuring the pipelined nature of the bus of the present invention. In other words, the order of the "responses" on the data bus must occur in the same order as the "requests" on the address bus. Therefore, some type of response to a particular request must appear on the data bus after the response of the request which immediately preceded the particular request on the address bus. If some type of response is not possible in a reasonable time (e.g., ten bus clocks), then all of the subsequent responses will be stalled by the agents responsible for generating them, hurting system performance. Note that the response itself may also be stalled.

To accommodate multiple pending requests that require deferred replies, the responding agent upon completing the bus cycle with a deferral response must be capable of designating the deferred reply with a particular request if the responding agent is to be able to accommodate multiple requests while one or more requests are pending. For example, when data is requested from the cache memory (e.g., L3 cache memory) and the cache controller sends a deferral response, if the cache memory is to be accessed while this request is pending, the responding agent (e.g., the cache controller) must include a mechanism to associate the data that becomes available to the request which requested it. In one embodiment, in processing block 306 the responding agents store deferred requests (and associated tokens) for which a deferral response is generated. When the data is available, the responding agent is able to identify the destination of the data using the stored token and deferred request. The responding agent is responsible for maintaining consistency when it provides a deferral response, such as when there are multiple requests to the same cache line.

The token latched by the responding agent is used as a future reference between the requesting or responding agent to identify the response to the requesting agent when made by the responding agent. The requesting agent using the token stored in the transaction pending queue (with an indication of the request with which it was associated) watches for the response to the request. When the responding agent is ready to complete the bus transaction, the same token (used when sending the request) is sent on the address bus. In one embodiment, a special command is used to indicate to agents on the bus that the address bus has a token instead of an address. Associated with the special command (e.g., control signal(s)) is the data (on the data bus) that was originally requested, if any, by the requesting agent. In this manner, the subsequently sent token re-establishes contact with the requesting agent.

Deferred Operations

During the Request Phase of a bus transaction, an agent may assert a Defer Enable (DEN#) signal to indicate if the transaction can be given a deferred response. Note that the "#" symbol indicates that the signal is active low. When the DEN# signal is deasserted, the transaction must not receive a deferred response. In one embodiment, all transactions in a buslocked operation, deferred reply transactions, and writeback transactions cannot be deferred. Transaction-latency sensitive agents can also use the DEN# signal feature to guarantee transaction completion within a restricted latency.

A DEFER# signal in conjunction with a HITM# signal are used to determine when a response is to be deferred. The HITM# signal, when asserted, indicates the presence of modified data in the cache. In-order completion of a transaction is indicated by the DEFER# signal being deasserted or the HITM# signal being asserted during the Snoop Phase, followed by normal completion or implicit writeback response in the Response Phase. When the Defer Enable (DEN#) signal is inactive (and the HITM# signal deasserted), the transaction can be completed in-order or it can be retried, but not deferred. Thus, any bus agent incapable of supporting a deferred response may use this to be compatible, requiring that the transaction be completed in-order as described above or retried. A transaction can be retried when the DEFER# signal is asserted and the HITM# signal is non-asserted during the Snoop Phase followed by a retry response during the Response Phase. That is, a bus agent incapable of supporting a deferred response will provide a retry response if unable to provide the required response at the time of the Response Phase.

When Defer Enable (DEN#) is asserted, the transaction can be completed in-order, can be retried, or deferred. When a transaction is to receive a deferred reply, the DEFER# signal is asserted (while the HITM# signal is deasserted) during the Snoop Phase followed by a deferral response in the Response Phase.

It is the responsibility of the agent addressed by the transaction to assert the DEFER# signal. In another embodiment, the responsibility can be given to a third party agent who can assert the DEFER# signal on behalf of the addressed agent.

In the present invention, a requesting agent assumes that every outstanding transaction issued with an asserted Defer Enable (DEN#) signal in the Request Phase may be completed with a deferred reply. To account for the possibility that each issued transaction may receive a deferred response, the requesting agent maintains an internal outstanding transaction queue, referred to herein as the pending request queue. Each entry in the queue has an ID. The number of queue entries (and the number of IDs) is equal to the number of requests the agent is able to issue and have pending. During the deferred reply of the second transaction, the requesting agent must compare the reply sent on the address bus with all deferred IDs in its pending request queue. On an ID match, the requesting agent can retire the original transaction from its queue and complete the operation.

If a responding agent is unable to guarantee in-order completion of a transaction, the responding agent asserts a DEFER# signal in the transaction's Snoop Phase to indicate that the transaction is to receive a deferred reply or is to be aborted. If the DEFER# signal is not overridden by another caching agent asserting the HITM# signal (indicating a hit to a modified line in the cache) in the Snoop Phase, then the responding agent owns the transaction response. The response of the responding agent is determined by its reply policy. If the responding agent is capable of and desires completing the request in a subsequent independent bus transaction, then it generates a deferral response.

After issuing a deferral response and once ready to respond, the responding agent issues a second independent bus transaction to complete the earlier request for which the response was deferred. This second transaction may return data to complete an earlier transaction (e.g., in case of a read operation), or it may simply indicate the completion of an earlier transaction (e.g., in case of a write operation).

FIG. 4 illustrates a deferral response followed by the corresponding deferred response to a read operation. Referring to FIG. 4, in T1, the requesting agent asserts the ADS# signal indicating that a valid bus definition and address is on the control and address buses. Also in T1, the requesting agent drives the {REQUEST} group to issue a Read Line request. In T2, the requesting agent drives the token into the address bus. The address and token are latched by the addressed agent in T2 and T3 respectively.

In the Snoop Phase, the addressed agent determines that the transaction cannot be completed in-order and hence asserts the DEFER# signal in T5. In T7, the addressed agent becomes the responding agent due to deasserted state of the HITM# signal in T6. The responding agent returns a deferral response in T7 by asserting the proper encoding on the RS[2:0]# signals. The RS[2:0]# signals are used to encode different types of responses, including a deferral response. Note that the responding agent stores the token latched from the address bus.

Prior to T9, the addressed responding agent obtains the data required in the original request. In T9, the responding agent issues a second transaction, using the token from the original transaction as the address. In T13, the response agent drives a valid information on the HITM# signal and the HIT# signal to indicate the final cache state of the returned line. The requesting agent picks up snoop responsibility. In T15, the responding agent drives normal completion response and begins the optional Data Phase, if necessary. The responding agent returns a successful completion response with data on the bus and drives data during T15–T18, which is received during T16–T19. In T21, the entire bus operation, consisting of the first and second transactions, is complete.

Note that in T10, the requesting agent observes the second transaction. The requesting agent compares the token received from the address bus with the token corresponding to the original request. The requesting agent observes the final state of the returned cache line in T14. In T16, the requesting agent receives the deferred reply and removes the transaction from its pending request queue (and the In-Order queue). This completes the bus operation.

In one embodiment, a memory agent or I/O agent in the computer system may defer a response on any request other than a bus locked request, another deferred reply transaction, or a cache line write designated for explicit writeback.

In the present invention, the deferred reply "wakes" up the original transaction. That is, the original transaction carries on and completes as if the requesting agent had initiated the transaction. For instance, when a memory agent returns a deferred reply to a processor in the system, the memory controller is not the master, and the processor acts as if it had initiated the transaction, responding to the handshaking on the bus.

Receiving a deferred reply removes the transaction from the In-Order queue. In order to complete the original request, the responding agent initiates a second independent transaction on the bus. The token (e.g., deferred reply ID), latched during the original transaction, is used as the address in the Request Phase of the second transaction.

In one embodiment, a token (e.g., deferred ID) contains eight bits, DID[7:0]#, divided into two four-bit fields. An exemplary token is shown in FIG. 5. The token is transferred on A[23:16]# (carrying DID[7:0]#) in the second clock of the original transaction's Request Phase. Address bus lines A[23:20]# contain the response agent ID, which is unique for every responding agent. Address bus lines A[19:16]# contain a request ID, assigned by the request agent based on its internal queue. An agent that supports more than sixteen outstanding deferred requests can use multiple agent IDs. In one embodiment, only four outstanding deferred requests may be supported by the processor of the computer system.

To complete the transaction, the address bus is used to return the token, which was sent with the request on DID [7:0]#. In the Request Phase of the second transaction, the token is driven on A[23:16]# on the first clock of the request phase. In the second clock of the Request Phase, the responding agent's identifier and transaction ID are driven (although not used by the original requesting agent). During the Response Phase, the deferred reply is driven along with any data during the Data Phase. The requesting agent decodes the token returned on A[23:16]# and compares it with previously deferred requests. The requesting agent compares A[23:20]# with its agent ID to see if there is a match. In case of a match, the requesting agent uses A[19:16]# as an index to point to the proper entry in its pending request queue. (Exemplary matching hardware is shown in FIG. 6.)

Responding Agent Embodiments

In the present invention, some responding agents never defer requests, some responding agents always defer requests, and some responding agents defer requests for certain operations and not other operations.

In the above illustrated embodiments, one agent may be the memory agent or I/O agent in a deferred operation.

If a caching memory controller, such as L3 cache controller 110, is in the computer system, the cache controller may also generate the deferred responses on read operations when the read data is not immediately available in the cache memory. The L3 cache controller will then proceed to obtain the data from the memory, such as main memory 121, while servicing any subsequent requests for data available in the L3 cache memory. When the read response is ready, the L3 cache controller arbitrates for the bus and returns the read data.

If an I/O bridge is in the computer system, the I/O bridge may defer bus transactions. It should be noted that this is typically performed according to an I/O bus standard, such as the PCI, EISA, ISA, MCA, PCMCIA, VESA standard. Generally, accesses to devices residing on the I/O bus take longer to complete than accesses issued to the memory devices. In a highly pipelined bus involving requests generated from multiple requesting agents, there is an intermix of I/O operations and memory operations. In order to eliminate the stalling effect of I/O accesses in subsequent memory accesses, the I/O bridge of the present invention may generate a deferred response to accesses directed towards itself (and the devices on the I/O bus). In one embodiment, the I/O bridge of the present invention has the hardware necessary for deferring multiple bus requests. When the response is ready, the I/O bridge arbitrates for the bus and initiates a deferred reply (a second independent transaction).

Token Generation and Recognition Hardware

In the present invention, each of the requesting and responding agents supports additional functionality in order to utilize the deferred protocol. In the present invention, the agents capable of deferral and deferred responses function as a bus master. Being a bus master according to the present invention comprises the ability to arbitrate for the bus and carry out a request transfer cycle. This allows the response agent to initiate the second transaction and to obtain control of the bus when completion signals or data is ready subsequent to the responding agent providing a deferral response. For instance, the processors are bus masters generally. On the other hand, memory controllers generally are not bus masters and, thus, would need to have this ability to initiate the later transactions to complete the bus operation.

In the illustrated embodiment, token generation is the responsibility of the requesting agent. One embodiment of a token of the present invention is shown in FIG. 5. Referring to FIG. 5, token 501 is comprised of eight bits divided between two components: a position ID 502 indicating the position of the deferred request in the internal pending request queue of the requesting agent and a requesting agent ID 503 indicating the source of the token. (The pending request queue will be described in more detail below). The requesting agent ID 503 is comprised of four bits. The requesting agent ID 503 may be comprised of more or less than four bits. For instance, the requesting agent ID 503 may be a 3-bit ID. The number of bits used to represent the ID of the requesting agent indicates the maximum number of requesting agents in the computer system that may accommodate deferred responses. For example, by using four bits for the ID, sixteen requesting agents that generate deferrable requests may exist on the bus.

As shown in FIG. 5, the number of bits used to indicate the position of the request in the pending request queue of the requesting agent comprises of four bits. The position of the request may be described using more or less than four bits. For instance, the request position may be a 2-bit number. The number of bits used to describe the position of the request indicates the size of the request queue. For example, using four bits for the position request indicates that the request queue is capable of having a maximum of 16 separately addressable entries.

A responding agent that is capable of deferred responses maintains an internal deferred request queue for storing tokens latched from the address bus when providing a deferral response. In one embodiment, this queue contains 16 entries, but may have more or less (e.g., 2–32 entries). In the present invention, only a small queue depth is sufficient since the comparison hardware need support only the entries that are actually deferred.

One embodiment of a request queue in a responding agent is shown in FIG. 6. Referring to FIG. 6, request queue 600 is shown having multiple entries, wherein each entry includes multiple fields. In one embodiment, queue 600 is a 16 entry queue. In the present invention, each entry row has a token field 601, a request field (REQ) 602, a byte enable (BE) field 603 and an address field 604. REQ field 602, BE field 603 and address field 604 represent the transaction information corresponding to each token in token field 601 in queue 600. REQ field 602 uses two request fields to store the type of request. BE field 603 stores the byte enable information that is used in further qualifying the request. Address field 604 stores the address.

In one embodiment, token field 601 comprises four bits and represents an index, REQ field 602 comprises 5 bits×2, BE field 603 comprises eight bits muxed, and address field 604 comprises 36 bits. The token field 601 may be implicit in the hardware and, hence, may not be physically implemented in the hardware. In one embodiment, the token field 601 is not implemented in hardware when the position of the entry in the queue is the same as the token field contents. Note also that the index of the token field may be a randomly generated value.

Also shown in FIG. 6 is comparison logic which receives four bits of the token (from a latch, for instance) representing the agent ID and compares them to the agent's ID to see if there is a match. In case of a match, the representing agent uses the other four bits as an index into the queue.

At the time the responding agent wishes to provide a deferral response, the responding agent assigns an entry for the transaction in the deferred request queue for storing the token latched from the address bus. The assigned entry in the queue of the responding agent stores the token and the REQ, BE, and Address fields. After the transaction is complete, the responding agent becomes a request bus owner and initiates a second bus transaction to provide a deferred reply. The responding agent also reclaims free queue entries in the deferred request queue.

The requesting agents of the present invention include logic for managing the request pending queue and for token generation. Based on the above description, this logic is well within the ability of those skilled in the art, and thus, will not be described further. The responding agents also have logic for managing their queues. Preferably, the responding agent is able to take appropriate action on the new request of the bus while the deferred requests are being processed. The responding agent is further provided with the capability to compare the address of the new request against the address of an entry in the deferred request queue. In one embodiment, each agent includes sixteen 31-bit latches and sixteen 31-bit comparators to compare the address of the new request to addresses stored in the deferred request queue of the responding agent. The size of the comparators may be reduced, such that only the lower bits in the address are compared. On a positive match, the responding agent may abort the new request to avoid any conflict with an already deferred request.

In the present invention, the requesting agents are capable of accepting and comprehending the deferred responses (e.g., the deferral response and the deferred reply). In the present invention, the requesting agents are also capable of taking the appropriate action(s) in response to these responses. One action may involve temporarily suspending a request.

In one embodiment, the requesting agents assumes that every outstanding transaction issued in the Request Phase may receive a deferral response. Each requesting agent includes a queue to temporarily store deferred requests (e.g., tokens and their associated requests). Therefore, the requesting agents maintain an internal pending request queue with the same size as its ability to issue new requests. One embodiment of the pending request queue is shown in FIG. 7. Referring to FIG. 7, queue 700 is shown having four entries, where each entry is comprised of 8 bits which include a requesting agent's request identifier field 701 and a field for the requesting agent's ID 702. The requesting agent ID 702 is the same for all entries in a particular requesting agent's queue. The number of bits used to represent the identifiers limits the number of designed entries in queue 700. In one embodiment, the identifier comprises four bits, but may comprise as many bits as necessary to support the total number of entries in queue 700. The agent ID field 702 is comprised of 4-bits for storing the agent's ID. Together the request identifier 701 and agent ID 702 form the token.

On observing a deferral response, the requesting agent maintains a copy of the token provided with the request in the generated token field 702 in outstanding transaction queue 700. The requesting agents also have the ability to release the bus after it received deferral response.

In one embodiment, a separate request pending queue is not required when the bus agent already includes a register file or list of bus operations that are pending. Since the agent ID is common to all queue entries, only a storage area specifying the pending transactions is required. The In-order queue, or other memory storage, that maintains a record of operations for the bus can be used as a pending request queue. Each of the transactions are identified using an index (e.g., 0,1,2,3). In one embodiment, only two bits are used to support index values for four possible pending transactions. A field for one or more bits may be added to the queue and used to indicate whether a request received a deferral response. Therefore, a separate request pending queue is not required. Note that token generation logic would have to obtain an agent's ID from a storage location and combine it with the request identifier (e.g., index into a bus queue) to generate a token.

The requesting agent also includes matching hardware for matching the subsequently returned data or completion signals to the appropriate request using the returned token. During the second independent transaction, the requesting agent matches the resent token with all stored tokens in its pending request queue. On an ID match, the requesting agent can complete the operation and discard the original suspended request from its pending request queue.

In one embodiment, each requesting agent includes comparator logic to perform the matching. In one embodiment, the comparator logic is comprised of 8-bit comparators for performing the matching and control logic for identifying the match and returning data to internal units with their interval tags. In another embodiment, separate agent ID and transaction ID (e.g., index) matching logic is used. One embodiment of the matching hardware for matching a transaction ID is shown in FIG. 8. Note that agent ID matching logic, such as described in FIG. 6 may be included as well. Referring to FIG. 8, matching hardware 800 comprises latch 801, latches 802–805 for storing the tokens (or a portion thereof) associated with deferred responses, comparators 806–809 for comparing the stored entries with the resent token, and NOR gate logic 810. Latch 801 is coupled to receive four bits of the reply token. The output of latch 801 is coupled to one input of each of comparators 806–809. The other input of each of the comparators 806–809 is coupled to the output of latches 802–805 respectively. The outputs of each of comparators 806–809 are coupled to the inputs of NOR gate logic 810.

In one embodiment, latch 801 comprises a 4-bit latch which receives the transaction ID from the resent token from the address bus. Latch 801 is sized according to the number of bits in the transaction ID of the resent token. Latch 801 supplies the transaction ID to each of comparators 806–809. Each of the tokens stored in the pending request queue of the requesting agent are supplied to the comparators 806–809 via latches 802–805. Latches 802–805 are sized according to the number of bits in the transaction ID of tokens.

After performing an agent ID match, each of comparators 806–809 compares the transaction ID of the resent token to those of the stored tokens. If there is a match to a token stored in the pending request queue, one of comparators 806–809 produces a high output. If there is not a match to a token stored in the pending request queue, none of comparators 806–809 produces a high output. If none of the outputs from comparators 806–809 is high, then the No Match output of NOR gate logic 810 is high, thereby indicating that the resent token does not correspond to a suspended request in the requesting agent. If one output from comparators 806–809 is high, then the match output of NOR gate logic 810 is high, thereby indicating that the resent token corresponds to a suspended request in the requesting agent. In case of a match, the requesting agent "wakes up" and latches the data on the data bus (optional) and receives the completion signals corresponding to the original request.

Note that latches and comparators large enough to accommodate the entire token (e.g., 8-bit comparators, latches) may be used. However, in view of the fact that the agent ID portion of the resent token is always the same, complexity and cost may be reduced by providing only one agent ID comparison with separate transaction ID comparisons.

If a separate request pending queue is not required (and an existing bus queue is used), the matching logic of the present invention matches the agent ID portion of the resent token with its ID and then uses the remainder of the returned token as an index into the queue.

In an alternative embodiment, the present invention could use the request address as part or all of the token. One embodiment of the token using the address is shown in FIG. 9. Referring to FIG. 9, token 900 includes three fields: request 903, request modifier 902 and address 901. In one embodiment, the request field 903 comprises four bits, the request modifier field 902 comprises four bits, and address field 901 comprises 36-bits. The request field 903 represents the request that was issued by the requesting agent. The request modifier field 902 contains information modifying the request. The address field 901 contains the address of the request. The responding agent returns token 900 in the same manner as the token depicted in FIG. 5.

One advantage in this embodiment is that it recognizes the fact that any token definition may be either too constraining or too expensive due to different requirements of specific applications. When a new token definition is made, the number of bits in the token definition must be fixed. Depending on the scheme chosen, this, in turn, limits both the number of request/response agents that can be supported on the bus and the number of requests that can be supported per agent. Regardless of the scheme chosen for some specific application, it may not be too constraining. Thus, using an address as a token would mean that no artificial limitations are introduced. Secondly, the use of no token takes into account the fact that for highest performance, a full address comparison is desired for a new request with all the entries in the pending request queue of the requesting agent. This is in addition to the token matching required for the deferred replies generated by the responding agents. The present invention does add complexity.

By using the address as a token, the original requesting agent simply snoops on the address and compares it with its internal pending request queue. The response-initiated bus transaction is performed in the same manner with the exception of clearly marking the address as returning from a deferred response. This allows the proper differentiation between deferred replies and normal requests.

The responding agents maintain an internal deferred request queue similar to that shown in FIG. 6. One embodiment of the deferred request queue is shown in FIG. 10. Referring to FIG. 10, queue 1000 is shown as having sixteen entries, where each entry is comprised of 54-bits which include a request (REQ) field 1001, a byte enable (BE) field 1002, and an address field 1003. In one embodiment, the REQ field comprises ten bits, the BE field comprises eight bits, and the address field comprises 36 bits. Queue 1000 stores the same information as the queue depicted in FIG. 6 with the exception that a separate field for the token is not needed since the address is already stored.

In this embodiment, the requesting agent is responsible for releasing the bus after receipt of a deferral response. Using the address as a token, the requesting agents still maintains an internal pending request queue with the same size as its ability to issue new requests.

The requesting agent also includes matching hardware for matching the subsequently returned data and/or completion signals to the appropriate request using the subsequently returned address. During the second independent transaction, the requesting agent matches the resent address (e.g., the token) with all tokens in its pending request queue. On an address match, the requesting agent can discard the original request from its pending request queue and complete the operation. In this embodiment, the requesting agent uses 54-bit latches and a 54-bit comparator per latch to perform the matching. In one embodiment, the comparator logic includes control logic for identifying the match and returning data to internal units with their internal tags.

When the address is used as the token, the requesting agent does not need to generate a token. The responding agent arbitrates for the bus and runs a bus transaction with the requested data and the original address. In one embodiment, the responding agent includes a 36-bit address plus 10-bit request bus driver to facilitate the sending of the address.

Note that this embodiment is advantageous in that no new pins or token specifications are required. Note also that in this embodiment, the requesting agents still have the overhead of full 36-bit address plus 10-bit request comparison. This logic overhead may be acceptable for both the processor and a caching I/O bridge where the existing snooping logic can be reused.

Exemplary Applications of the Present Invention by the Processor and Various Controllers The processor of the present invention performs speculative and out-of-order execution. This implies that the microengine of the processor continues execution beyond missing data references. After the access is verified as a miss within the cache memory of the processor and the backside cache memory, the request is sent to the processor-memory bus. A long latency access can be optimally satisfied by returning a deferral response to the processor to free up the bus. In this manner, the processor can continue additional data transfers.

The deferred transaction capability of the processor-memory bus can be exploited by the external subsystems. For instance, the L3 cache may return a deferred response on a cache miss and a normal in order response on a cache hit. The L3 cache controller continues to access externally and completes the request with a second independent transaction after the data is received. In the meantime, the processor-to-L3 cache memory data transfers continue. Thus, the deferred response mechanism of the present invention allows for non-blocking components to be implemented between the processor and a processor-memory (e.g., system) bus.

The present invention also is advantageous to any access from the processor to the I/O bridge. Because accesses from the processor to the I/O bridge would involve a long latency as compared with other memory elements directly resident on the system bus, all I/O bridge accesses from the processor may be given a deferral response resulting in a substantial improvement in available processor bandwidth.

In the present invention, a bus transaction occurs in a normal pipelined manner with addresses being driven onto the address bus and data being returned on the data bus. When a deferred bus transaction occurs, a deferred reply may be generated. The present invention reuses the existing bus architecture to indicate that the access is a deferred type of access. In other words, in the present invention, when a responding agent prefers to not respond to its request in a pipelined manner, a deferral response is made and the responding agent latches a token sent by the requesting agent. In this manner, the token maintains the relationship between the requesting agent and the responding agent. When a requesting agent is waiting for a normal response, the requesting agent recognizes that the responding agent has returned a deferral response, as opposed to a normal response. Thus, by allowing the token to be sent on the address bus, no additional hardware, such as a separate token bus, is required. In this manner, the present invention allows for deferred transactions to occur without any increase in the number of pins. In fact, because separate token buses are not required for the request and response paths, the present invention reduces the number of pins required by each package to perform deferred bus transactions.

In the present invention, the responsibility for token management is placed on both the requesting agent and the responding agent. The requesting agent is responsible for supplying the token, while the responding agent is responsible for supplying the deferred reply at the appropriate time. In the present invention, only those units designed to use the token use them. The computer system could include other response agents, such as a memory controller, which only produce in-order response and do not create deferred responses. These "in-order" agents always return completion signals and/or data in a pipelined manner. Thus, the present invention allows design of simpler in-order response agents with zero logic burden in the presence of other agents capable of generating deferred responses.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for performing deferred bus transactions in a computer system has been described.

We claim:

1. A computer system comprising:
   an address bus; and
   a requesting agent coupled to the bus and operable to issue a request onto the bus in a first bus transaction by driving an address onto the address bus in a first clock cycle of the first bus transaction and request identification information onto the address bus in a second clock cycle of the first bus transaction, wherein said requesting agent comprises:
   a pending defer queue to store pending requests,
   a first logic circuit to recognize a subsequent deferred reply on the bus in a second bus transaction as corresponding to the request in the pending defer queue, wherein the requesting agent processes the deferred reply as a response to the request substantially as if undeterred.

2. The computer system defined in claim 1 wherein the pending defer queue comprises a plurality of entries, wherein each of the plurality of entries comprises a plurality of fields to store the request identification information, wherein one of the plurality of fields stores a token and another of the plurality of fields stores request information associated with the token.

3. The computer system defined in claim 1 wherein the first logic circuit comprises:
   a latch coupled to receive a token identifying the subsequent deferred reply on the bus;
   matching logic coupled to the latch and configured to compare an identification (ID) of the requesting agent to a first portion of the token, wherein the requesting agent indexes the pending defer queue with a second portion of the token if the matching logic determines that the ID matches the first portion of the token.

4. A computer system comprising:
   an address bus; and
   a requesting agent coupled to the address bus and including,
      means for issuing an address and request identification token pairs onto the address bus in consecutive bus cycles for each bus request as art of a bus transaction.

5. The computer system of claim 4 wherein the requesting agent further comprises:
   means for responding to a deferred reply on the address bus as if not deferred.

6. A computer system comprising:
   an address bus; and
   a requesting agent coupled to the bus and operable to issue a request onto the address bus in a first bus transaction by driving an address and request identification information onto the address bus, wherein said requesting agent comprises:
      a pending defer queue to store pending data requests,
      a first logic circuit to recognize a subsequent deferred reply on the address bus in a second bus transaction as corresponding to the request in the pending defer queue, wherein the requesting agent processes the deferred reply as a response to the request substantially as if undeferred.

7. A method of performing bus operations in a computer system having an address bus and a data bus, the method comprising steps of:
   a first agent sending an address on the address bus to a second agent;
   sending a first token on the address bus to the second agent;
   providing a first response to the first agent indicating that the second agent is to provide a deferred reply in response to the address;
   sending a second token on the address bus to the first agent;
   the second agent sending the deferred reply on the address bus to the first agent; and
   recognizing the second token and deferred reply as corresponding to the address and the first token.

8. The method defined in claim 7 wherein the first token is sent on the address bus in the clock cycle immediately after the address is sent on the address bus.

9. The method defined in claim 7 further comprising the step of asserting at least one signal indicating the address bus contains token information when the second agent sends the second token on the address bus.

10. The method defined in claim 7 wherein the first and second tokens are the same.

11. The method defined in claim 7 further comprising the step of driving data onto the data bus when the second agent sends the deferred reply.

12. The method defined in claim 7 wherein the step of recognizing comprises the step of matching the second token to the first token.

13. A computer system comprising:
   an address bus;
   a requesting agent coupled to the address bus and including,
      a first logic circuit configured to issue address and request identification token pairs onto the address bus in consecutive bus cycles for each bus request as part of a bus transaction.

14. The computer system of claim 13 wherein the requesting agent further comprises:
   a second logic circuit configured to respond to a deferred reply on the address bus as if not deferred.

15. A method for performing bus operations in a computer system having an address bus and a data bus, the method comprising steps of:
   a first agent initiating a bus request as part of a bus operation, wherein the step of initiating a bus request comprises driving an address on the address bus
   a first agent driving a first token on the address bus;
   providing a first response to the first agent indicating that a second agent is to provide a deferred reply in response to the address and the second agent receiving the first token from the address bus;
   the second agent driving a second token on the address bus;
   the second agent sending the deferred reply to the first agent;
   the first agent receiving the second token from the address bus;
   the first agent identifying the second token as corresponding to the bus operation; and
   receiving the deferred reply by the first agent, thereby completing the bus operation.

16. The method defined in claim 15 wherein the second token is the same as the first token, such that the first agent identifies the second token as corresponding to the bus operation by comparing the first token and the second token to determine if the first token and the second token are the same.

17. The method defined in claim 15 wherein the step of driving the second token comprises asserting at least one signal indicating that the address bus contains token information.

18. The method defined in claim 15 wherein the step of sending the deferred reply comprises sending at least one completion signal to the first agent.

19. The method defined in claim 15 wherein the step of sending the deferred reply comprises driving data on the data bus.

20. A method for performing bus transactions in a computer system having an address bus and a data bus, the method comprising the steps of:
   a first agent driving an address and a first token on the address bus as part of a request to initiate a first bus transaction;
   latching the first token;
   sending a deferral response in response to the request;
   the first agent receiving the deferral response to complete the first bus transaction;
   a second agent sending a deferred reply as part of a second bus transaction, wherein the step of sending a deferred reply comprises sending a second token on the address bus; and the first agent identifying the deferred reply corresponding to the request, such that the request is completed using two bus transactions.

21. The method defined in claim 20 wherein the step of identifying includes comparing the first token and the second token and receiving the deferred reply if the first token and the second match.

22. The method defined in claim 20 further comprising the step of buffering the address and the first token for use as a reference when receiving the deferred reply.

23. A computer system comprising:
   an address bus;
   a data bus;
   a control bus;
   a first bus agent coupled to the address bus, the data bus, and the control bus for performing a bus operation wherein the first bus agent initiates the bus operation by initiating a first bus transaction by driving a request address of a request and request identification information onto the address bus during consecutive clock cycles, and terminates the first bus transaction upon receiving an immediate response to satisfy the request or a deferral response indication on the control bus indicating response to the request is to be deferred.

24. The computer system defined in claim 23 further comprising a second bus agent for providing the immediate response to the first bus agent.

25. The computer system defined in claim 23 further comprising a second bus agent for providing the deferral response to the first bus agent.

26. The computer system defined in claim 23 further comprising a second bus agent to initiate a second bus transaction, in response to the first bus transaction, by driving the request identification information and a deferral reply onto the address bus.

27. The computer system deferred in claim 26 wherein the first bus agent receives the request identification information and deferred reply and associates the deferred reply with the request of the first bus transaction to complete the bus operation.

28. A method of performing bus transactions in a computer system having a requesting agent and a responding agent each coupled to a bus which includes a response bus, an address bus, and a data bus, the method comprising the steps of:
   the requesting agent requesting a first bus transaction by issuing an address and a token onto the address bus; and
   if the responding agent is ready to perform the first bus transaction, the responding agent driving an in-order completion response onto the response bus in a response phase of the first bus transaction; and
   if the responding agent is not ready to perform the first bus transaction, then
      the responding agent driving a deferral response onto the response bus in the response phase of the first bus transaction, and when the responding agent becomes ready to respond, then the responding agent initiating a second bus transaction and driving a deferred reply onto the address bus, a second token onto the address bus, and any requested data onto the data bus, in response phase of the second bus transaction.

29. A computer system comprising:
   a bus including:
      an address bus;
      a response bus;
      a data bus;
   a requesting agent coupled to the bus, wherein the requesting agent issues a token onto the address bus for each address request and handles deferral responses in response to requests, and maintains the request as pending until receiving a deferred reply; and
   a responding agent coupled to the bus, wherein the responding agent generates the deferral response when a transaction cannot be completed during a predetermined time, and the responding agent generates the deferred reply, including the token, when the transaction can be completed.

30. A method of performing bus operations in a computer system having an address bus and a data bus, the method comprising:
   a first agent sending an address on the address bus to a second agent;
   sending a first token on the address bus to the second agent;
   the first agent receiving a first response from the second agent indicating that the second agent is to provide a deferred reply in response to the address;
   the first agent receiving a second token driven on the address bus by the second agent;
   the first agent receiving the deferred reply driven on the address bus by the second agent; and
   recognizing the second token and deferred reply as corresponding to the address and the first token.

31. The method defined in claim 30 wherein the first token is sent on the address bus in the clock cycle immediately after the address is sent on the address bus.

32. The method defined in claim 30 further comprising asserting at least one signal indicating the address bus contains token information when the second agent sends the second token on the address bus.

33. The method defined in claim 30 wherein the first and second tokens are the same.

34. The method defined in claim 30 further comprising receiving data driven onto the data bus by the second agent with the deferred reply.

35. The method defined in claim 30 wherein recognizing the second token comprises matching the second token to the first token.

36. A method for performing bus transactions in a computer system having an address bus and a data bus, the method comprising:
   a first agent driving an address and a first token on the address bus as part of a request to initiate a first bus transaction;
   the first agent receiving a deferral response from a second agent to complete the first bus transaction;
   the first agent receiving a deferred reply as part of a second bus transaction, wherein receiving the deferred reply comprises receiving a second token on the address bus; and
   the first agent identifying the deferred reply as corresponding to the request, such that the request is completed using two bus transactions.

37. The method defined in claim 36 wherein identifying the deferred reply includes comparing the first token and the second token and receiving the deferred reply if the first token and the second match.

38. The method defined in claim 36 further comprising buffering the address and the first token for use as a reference when receiving the deferred reply.

39. A method for performing bus operations in a computer system having an address bus and a data bus, the method comprising:
   a first agent receiving an address on the address bus for a bus request as part of a bus operation from a second agent;

providing a first response to the second agent indicating that the first agent is to provide a deferred reply in response to the address and the first agent receiving a first token from the address bus;

the first agent driving a second token on the address bus; and the first agent sending the deferred reply to the second agent to complete the bus operation once the second agent receives and the second token from the address bus and identifies the second token as corresponding to the bus operation.

40. The method defined in claim 39 wherein the second token is the same as the first token, such that the second agent identifies the second token as corresponding to the bus operation by comparing the first token and the second token to determine if the first token and the second token are the same.

41. The method defined in claim 39 wherein driving the second token comprises asserting at least one signal indicating that the address bus contains token information.

42. The method defined in claim 39 wherein sending the deferred reply comprises sending at least one completion signal to the first agent.

43. The method defined in claim 39 wherein sending the deferred reply comprises driving data on the data bus.

* * * * *